United States Patent
Nishitani

(10) Patent No.: US 6,424,463 B1
(45) Date of Patent: Jul. 23, 2002

(54) REVERSIBLE PROJECTION SCREEN FOR VARYING LIGHT CONDITIONS

(76) Inventor: Tatsuro Nishitani, Yokufuen, 12-1, Takaido-nishi 1-chome, Suginami-ku, Tokyo (JP), 168-0071

( * ) Notice: Subject to any disclaimer, the term of this patent is extended or adjusted under 35 U.S.C. 154(b) by 0 days.

(21) Appl. No.: 09/458,981

(22) Filed: Dec. 10, 1999

(30) Foreign Application Priority Data

Dec. 15, 1998 (JP) .......................................... 10-355674

(51) Int. Cl.[7] ............................................. G03B 21/56
(52) U.S. Cl. ..................................................... 359/449
(58) Field of Search ................................. 359/443, 449, 359/459, 461

(56) References Cited

U.S. PATENT DOCUMENTS

| | | | | |
|---|---|---|---|---|
| 3,510,197 A | * | 5/1970 | Seki et al. .................. | 359/461 |
| 4,229,085 A | * | 10/1980 | Yamada et al. ............. | 359/459 |
| 5,127,722 A | | 7/1992 | Nishitani ..................... | 359/443 |
| 5,337,179 A | * | 8/1994 | Hodges ....................... | 359/443 |
| 6,023,369 A | * | 2/2000 | Goto ........................... | 359/443 |
| 6,144,491 A | * | 11/2000 | Orikasa et al. ............. | 359/459 |

FOREIGN PATENT DOCUMENTS

JP          48-6972          3/1973

* cited by examiner

*Primary Examiner*—Christopher Mahoney
(74) *Attorney, Agent, or Firm*—Armstrong, Westerman & Hattori, LLP

(57) ABSTRACT

A projection screen applicable in accordance with the brightness of the location and the luminance of the projector is provided. A mirror surface film 113 is sandwiched and bonded between image forming films 111 and 112. The image forming film 111 is colorless and transparent while the image forming film 112 is gray and transparent. These image forming films have surfaces delustered and embossed to centrally direct a horizontally and vertically reflected image.

2 Claims, 5 Drawing Sheets

REVERSIBLE PROJECTION SCREEN FOR VARYING LIGHT CONDITIONS

BACKGROUND OF THE INVENTION

The present invention relates to a wind-up projection screen which receives image lights coming from projectors such as the overhead projector (OHP), the CRT video projector, the liquid crystal projector or the like and, particularly, to a projection screen which assures the optimum luminance, contrast, color reproduction or the like in accordance with the brightness of a location or the luminance of a projector to be used.

There was conventionally proposed a typical projection screen 21 as shown in FIG. 5 which is suspended from the ceiling while a projector 23 placed on a floor stand projects image lights therefrom towards the screen 23 for spectators' view.

The surface of this projection screen is subjected to a delustering treatment (by means such as dulling or matting finish) to insure that the image lights are scattered (for forming an image). There was further provided a type having its surface subjected to embossing to insure that the projector operates to centrally direct the projection lights otherwise scattering in upward and downward directions while centrally directing the projection lights otherwise scattering in right and left directions such that the screen gain attains the level of 10 or more (which is ten times the reflection rate of the standard white).

So far, the progress in the recent development of the projector 23 is remarkable and the values showing the brightness or luminance thereof has continued to rise to such an extent that some projector attained the brightness thereof which has become 30 or more times those of the primitive CRT projectors (for example, 1500 ANSI lumen). Therefore, the long lasting method for projection within a dark room is no longer necessary because projection is possible even in a bright living space.

However, no matter how the brightness of the image lights projected by the projector is increased, lights E coming from an illumination appliance or through windows from outside in an ordinary living are reflected in the form of white lights by the projection screen 21 space to reach the spectators such that the image lights formed by the projector screen 21 are mixed with said white lights because the projection screen itself looks white.

As a result, the projected image with high luminance can become cloudy or nebulas in its entirety unlike the original image to mar the color reproduction or contrast in the image. Particularly, since black can turn into gray to make letters or symbols illegible against white shining with high luminance and the higher luminance the weary eye results.

SUMMARY OF THE INVENTION

The problem to be solved by the present invention is to provide a projector screen which is capable of forming a high quality image with a high luminance projection lights even in a bright space as well as with a low luminance projection lights in a dim location.

The present invention essentially provides a projection screen comprising a first image forming film of a colorless transparent soft resin, said first image forming film having a face side and a reverse side, said face side being delustered and embossed such that horizontally and vertically reflected lights are centrally directed, a second image forming film of gray colored transparent soft resin, said second image forming film having a face side and a reverse side, said face side being delustered and embossed such that horizontally and vertically reflected lights are centrally directed; said first and second image forming films being of an equal thickness and hardness; and a non-stretchable mirror surface film sandwiched and bonded between said reverse side of the first image forming film and said reverse side of the second image forming film.

DESCRIPTION OF THE PREFERRED EMBODIMENTS

Figure 1A:
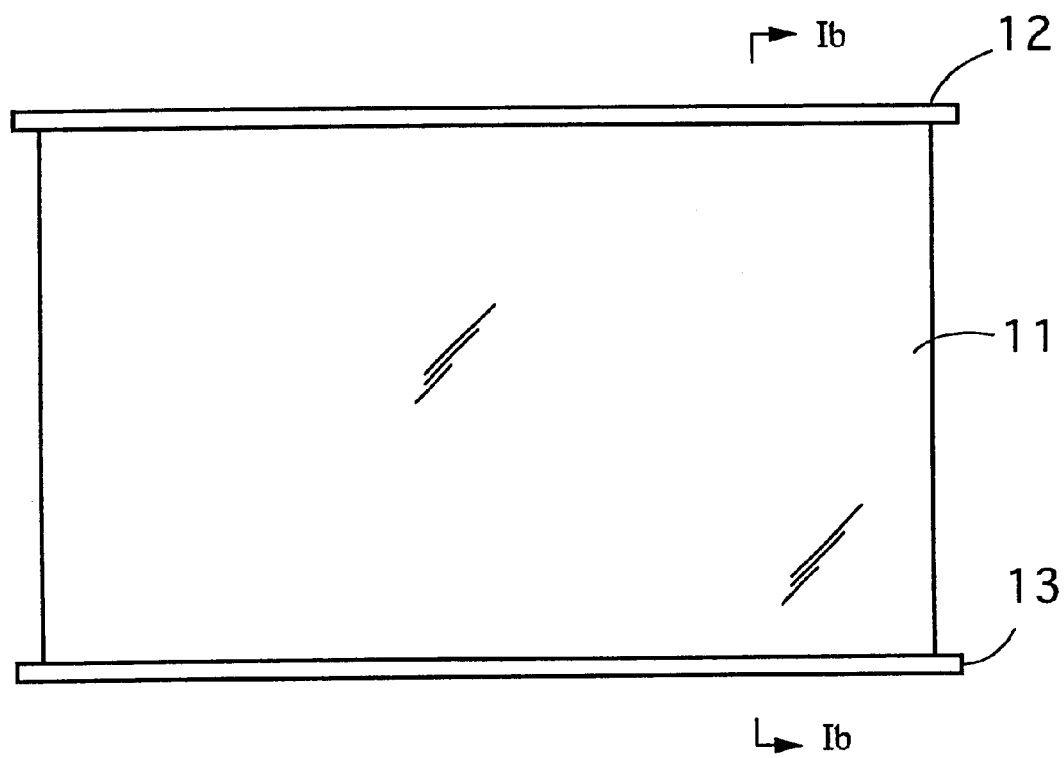
FIG. 1a is a front view of one embodiment of the present invention relating to the projection screen showing the suspended state thereof.
Figure 1B:
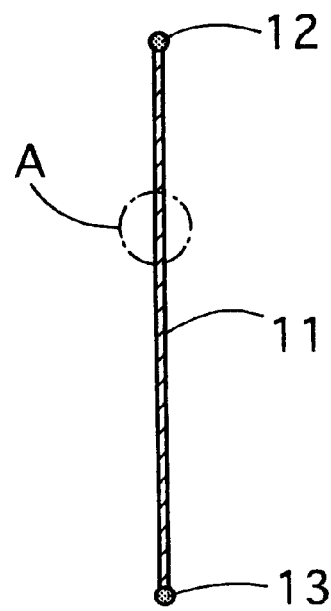
FIG. 1b is a side elevation in section taken along the line Ib—Ib.

FIG. 1 is a view representative of the first embodiment of the invention relating to a projection screen, in which 11 denotes a screen per se, 12 an upper support bar, 13 a lower support bar which is of some weight. When the screen is suspended to be unscrolled with the upper support bar 12 being hooked (not shown) on the wall or the ceiling such that the lower support bar 12 is in a vertical registration with upper support bar 12 to set the screen 11 in a taut state.

Figure 2:
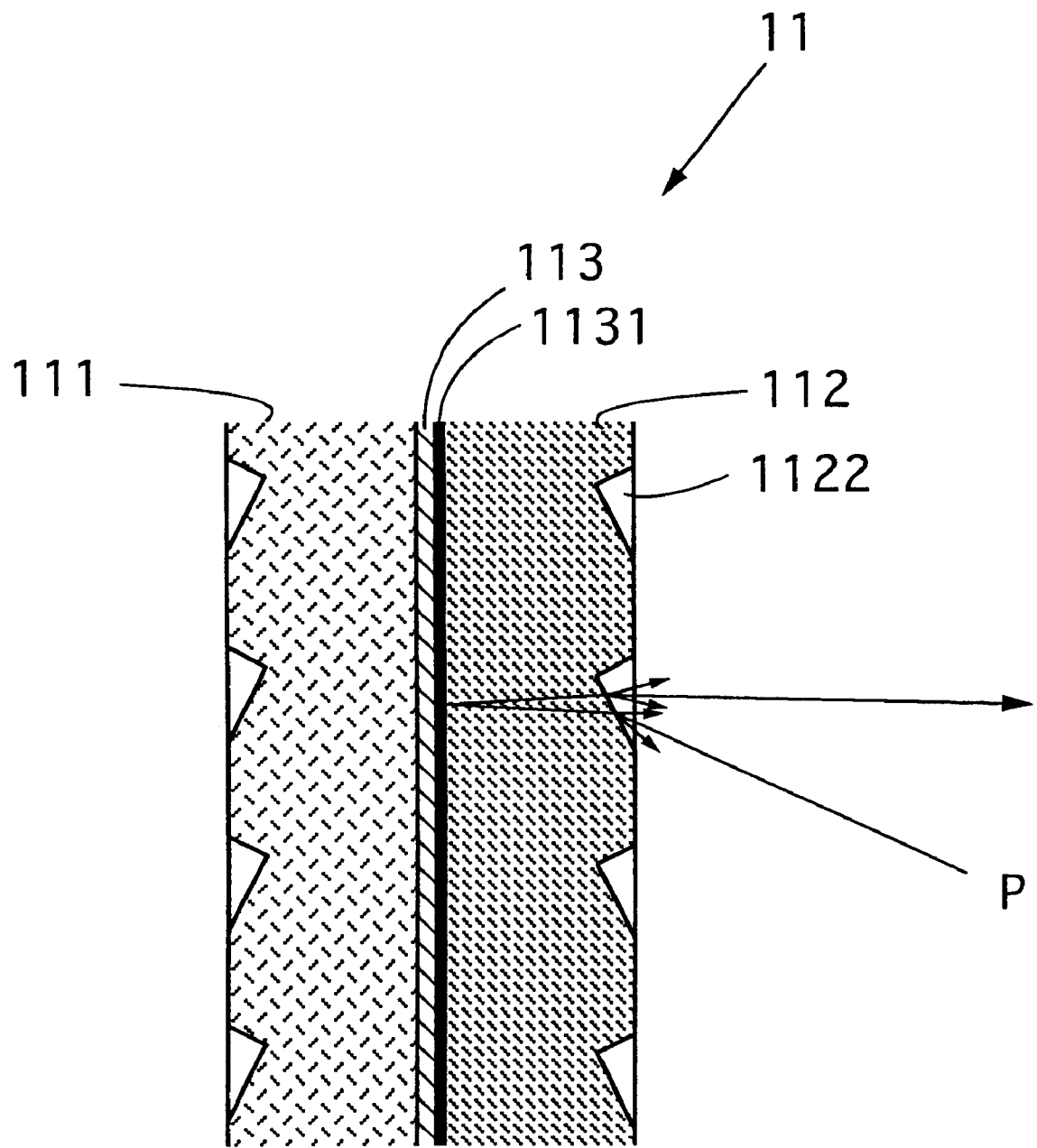
FIG. 2 is an enlarged sectional view of the portion A of FIG. 1b.

As seen in FIG. 2 which is an enlarged view of a cross section A shown in FIG. 1, the screen body 11 is composed of a first image forming film 111 of a colorless transparent soft resin such as polyvinyl chloride (PVC), said first image forming film being subjected to delustering and embossing; a second image forming film 112 of colored transparent soft resin such as polyvinyl chloride, said second image forming film having an optimum quantity of black coloring element (or a plurality of coloring elements to produce black on the color mixture principle) mingled such that some or tens percent of the lights are shielded, said second image forming film being subjected to delustering and embossing; and a mirror surface film 113 of a transparent polyester film or the like having an aluminum deposited mirror surface 1131 to form a mirror surface 1131, said image forming films 111 and 112 having face and reverse sides. said mirror surface film 113 being sandwiched and bonded between the respective sides of said first and second image forming films 111 and 112.

Said image forming films 111 and 112 provided on both sides of the mirror surface film 113 have a little stretchable characteristic, are made of an equal material and have an equal thickness (for example, about 150 $\mu$m to 200 $\mu$m). Further, being equally subjected to delustering and embossing, said image forming films 111 and 112 have an equal hardness. On the other hand, the mirror surface film 113 has a thickness of about 20 $\mu$m and is non-stretchable. In this connection, said mirror surface 1131 has a thickness of about 1/100 $\mu$m.

Therefore, when the screen 11 per se is wound up, one of said image forming films 111 and 112 are stretched while the other thereof is compressed on the respective sides of the non-stretchable mirror surface film 113. However, since both films 111 and 112 are of the same hardness and thickness, the compressed film extends while the stretched one shrinks such that the screen body 11 are resumed to the original planar configuration without leaving curls or wrinkles thereon. Moreover, there are arranged a plurality of wedge-shaped boss lenses in a horizontal direction, said lenses being V-cut formed such that the scrolling action is facilitated while eliminating the likelihood of producing wrincles in the surface of the screen 11 per se.

Figure 3:
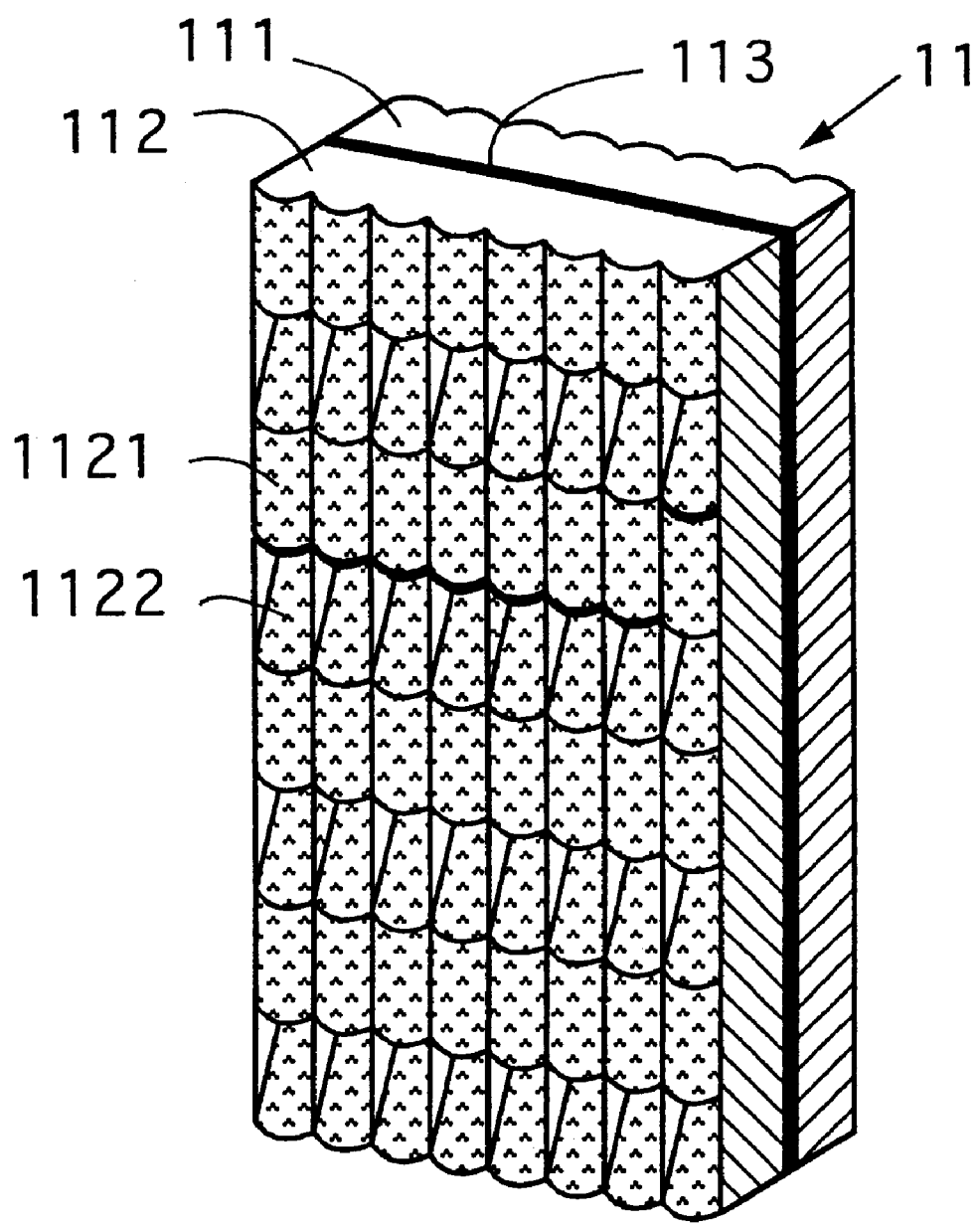
FIG. 3 is a perspective view of the image forming film.

FIG. 3 is an enlarged view of the image forming film 112. The surface of said image forming film 112 is embossed such that seven (7) semi-cylindrical lenses 1121 having a semicircular cross section are arranged in a 1 mm horizontal space while about two (2) wedge-shaped bosses 1122 are arranged in a 1 mm vertical space. Since the embossing of the other image forming film 111 is similarly done, the following explanation will be made only regarding the image forming film on behalf of the film 111.

Said semi-cylindrical lens 1121 functions to direct centrally lights P incident thereon from the projector and reflected by the mirror surface 1331 to prevent the same from diffusing in right and left directions. On the other hand, the wedge-shaped bosses 1122 fuictions to direct centrally lights incident thereon from below and reflected by the mirror surface 1331 as shown in FIG. 2. Thus, the lights going out from the image forming film 112 are centrally directed horizontally and vertically provided that horizontal directing is more liberal. This mode of focussing is necessary because a plurality of viewers tend to line up in a horizontal direction.

Now, when an image is formed on the image forming film 112 of the projection screen in this embodiment suspending from a wall or a ceiling, any lights coming from an illumination appliance or external lights from outside through a window to impinge on said image forming film 112 to illuminate the same will be reflected in a diffused manner in part by the delustered surface of the image forming film 112 but the rest is subjected to a little attenuation by the black coloring elements mingled and distributed therewithin before it is reflected by the mirror image 1131 subject to a further attenuation to be diffused by the delustered surface such that the entire screen surface on the image forming film 112 side gives gray not white as influenced by the external lights.

As a result, when the lights are projected from the projector on the image forming film 112, said gray color becomes a threshold (or a minimum luminance) to form an image there such that the black portions in the projector lights (the portions on which the lights will not positively impinge) is prevented from becoming cloudy or nebulas, thus securing a definite contrast. Further, the reproduced color will be deep to improve the color reproduction by the same token.

The black coloring elements mingled in the soft resin constituting the image forming film 112 are caused to enter at the time of kneading a transparent base resin (PVC or the like) into a transparent plasticizer. If the black coloring elements to be mingled are increased, the color produced on the general screen will be darker to decrease the luminance thereof in its entirety. On the other hand, if said elements is too little, the image will be cloudy or nebulas to spoil the contrast. Therefore, a control for optimum mixing is hoped for considering the both characteristics.

Next, if the projection is done in a place free from the external lights or if a low luminance projector is used, the image forming film 111 on the other side of the screen will be used. In this case, said embossed image forming film 111 functions as a high luminance screen such that it is possible to project a bright projection image with a desired contrast and a desired color reproduction.

In summary, the projection screen as practiced in this embodiment is composed of a non-stretchable mirror image film 113 applied with a base agent (polyester or the like); and a stretchable image forming films 111 and 112 integrally held and bonded therebetween, said stretchable image forming films 111 and 112 being of the same thickness and hardness. Therefore, the claimed screen which is stored in scroll will not produce curls or wrinkles in image forming films 111 and 112 when unscrolled for use in a suspended state. Therefore, no warped projection screen will be produced.

Further, the surfaces of the image forming films 111 and 112 have semi-cylindrical lenses and wedge-shaped lenses which are subjected to embossing in addition to delustering for diffusion (or for forming an image). The projection lights projected from the projector and reflected therebetween are directed effectively into the direction of viewers to secure a high screen gain.

While the colorless and transparent image forming film 111 functions as a high luminance screen such that the image lights are effectively reflected, the gray and colored image forming film 112 further functions as a high luminance and high performance screen which shows improved contrast and color reproduction when used in a bright location. Thus, a reasonably high quality image may be reproduced by proper use of the image forming films 111 and 112 depending on the presence or absence of any external lights and brightness at the location and the luminance of the projector.

Figure 4:
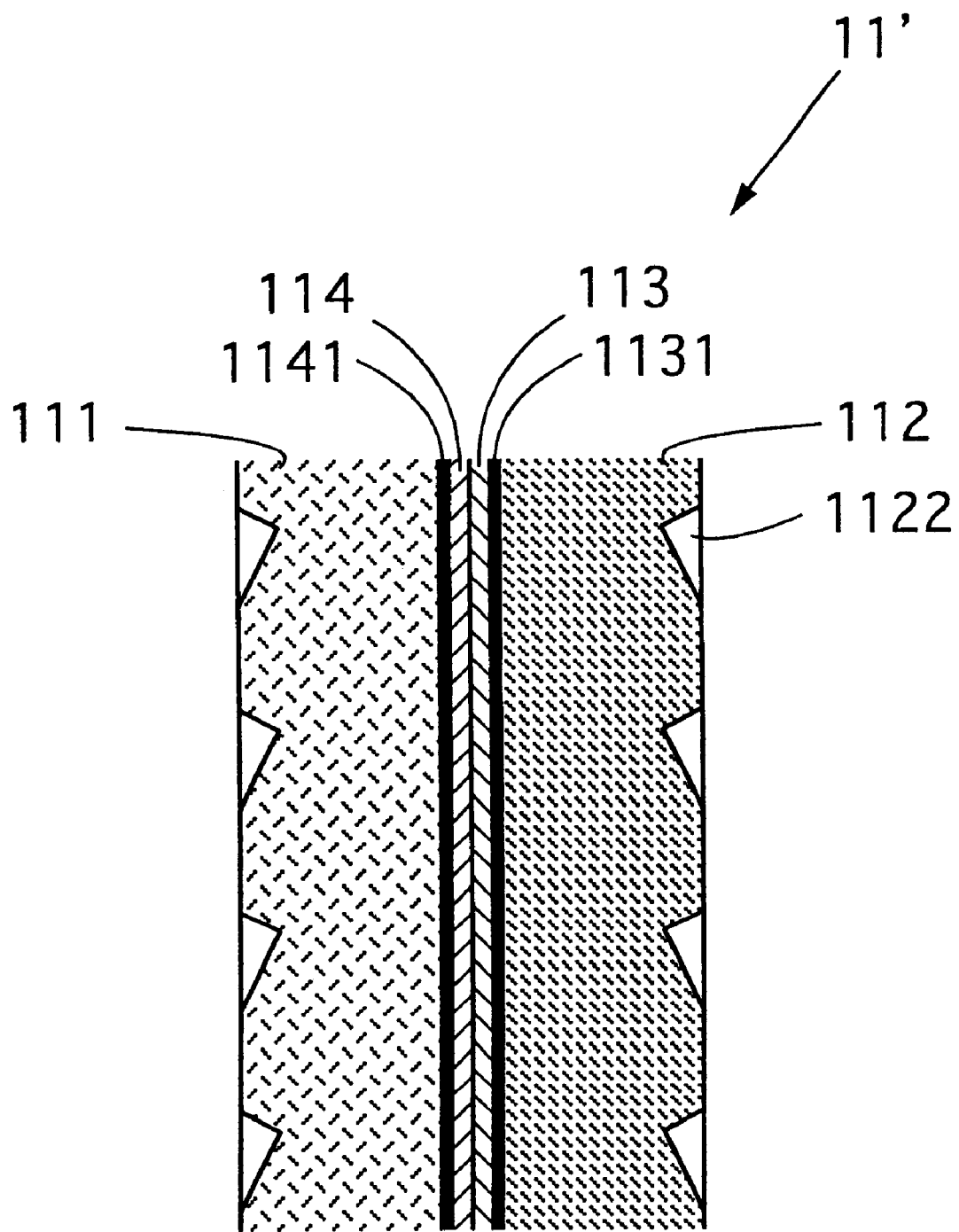
FIG. 4 is an enlarged sectional view of another embodiment.
Figure 5:
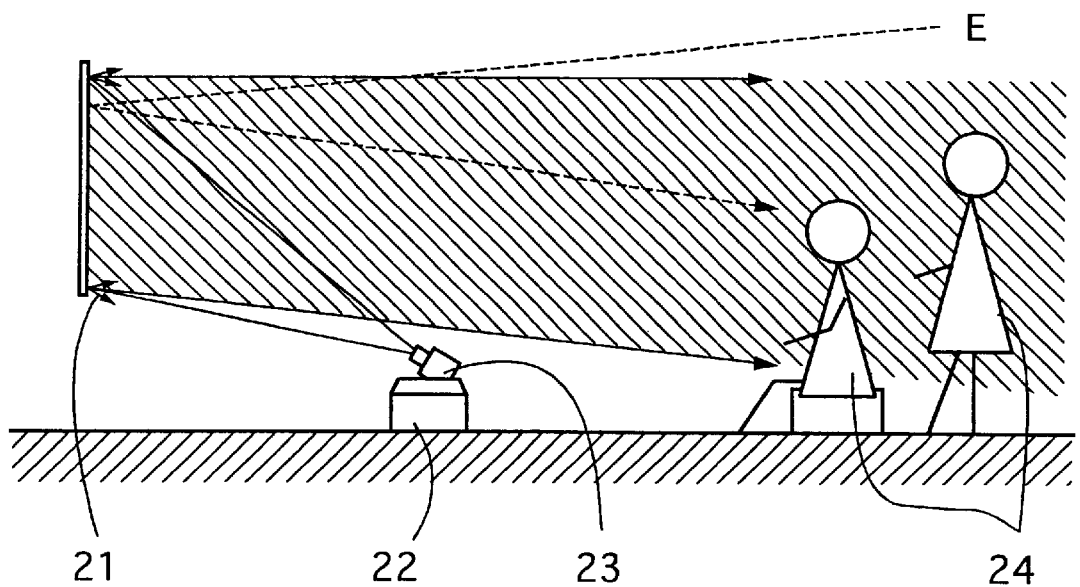
FIG. 5 is a view of a conventional projection screen and projector being used.

In the embodiment so far explained, the mirror image film 113 is formed with the mirror surface 1131 on a first side thereof while no such mirror surface is formed on a second side thereof. Since the second side is bonded to the reverse side of said image forming film 111 while the first side of the mirror image film 113 is bonded to the reverse side of the image forming film 112, the bonding conditions thereof at the reverse sides of the image forming films 111 and 112 are not equal, thus creating the likelihood that the extent of aging is different at opposite bonding surfaces. Therefore, there is proposed a screen body 11' as shown in FIG. 4, which, in addition to the image forming film 112, the reverse side of the image forming film 111 is also applied with a mirror surface film 114 having an aluminum deposited mirror surface 1141 before the mirror surface films 113 and 114 on the respective reverse sides of the image forming films 111 and 112 are eventually bonded to each other. As a result, the bonding conditions on the reverse sides of the respective image forming films 111 and 112 are equal such that the extent of aging becomes substantially the same.

As detailed in the foregoing, the projection screen of the present invention has an excellent advantage that, although a wind-up type, it will not create any curl or wrinkles while a projection is made under an optimum condition depending on the brightness of the location and the luminance of the projector.

What is claimed is:

1. A reversible projection screen comprising
a first image forming film comprising a colorless transparent soft resin, said first image forming film having a face side and a reverse side, said face side being delustered and embossed for image forming such that horizontally and vertically reflected lights are centrally directed, a second image forming film comprising gray colored transparent soft resin, said second image forming film having a face side and a reverse side, said face side being delustered and embossed for image forming such that horizontally and vertically reflected lights are centrally directed;

said first and second image forming films being of an equal thickness and hardness; and a non-stretchable mirror surface film sandwiched and bonded between said reverse side of the first image forming film and said reverse side of the second image forming film.

2. A projection screen as set forth in claim 1, wherein said non-stretchable mirror surface film comprises a plastic substrate and aluminum deposited on at least one side thereof to form a mirror surface thereon.

* * * * *